U S006897388B2

(12) United States Patent
Greer

(10) Patent No.: US 6,897,388 B2
(45) Date of Patent: May 24, 2005

(54) APPARATUS AND METHOD FOR REMOTELY MOVING A CIRCUIT BREAKER INTO OR FROM A CIRCUIT BREAKER CELL HOUSING

(75) Inventor: Chester Levi Greer, Baton Rouge, LA (US)

(73) Assignee: Siemens Energy & Automation, Alpharetta, GA (US)

( * ) Notice: Subject to any disclaimer, the term of this patent is extended or adjusted under 35 U.S.C. 154(b) by 0 days.

(21) Appl. No.: 10/280,638

(22) Filed: Oct. 25, 2002

(65) Prior Publication Data

US 2003/0200648 A1 Oct. 30, 2003

Related U.S. Application Data

(60) Provisional application No. 60/369,740, filed on Mar. 28, 2002.

(51) Int. Cl.[7] .............................................. H01H 29/16
(52) U.S. Cl. .................... 200/200; 200/296; 200/50.24
(58) Field of Search ................................ 200/337, 334, 200/17 R, 296, 50.21, 50.32, 50.24, 200, 202, 203, 205

(56) References Cited

U.S. PATENT DOCUMENTS

| | | | |
|---|---|---|---|
| 3,032,221 A | | 5/1962 | Carlis et al. |
| 3,494,494 A | | 2/1970 | Lindgren |
| 3,767,874 A | * | 10/1973 | Wilson .................... 200/50.26 |
| 4,176,262 A | * | 11/1979 | McMillen et al. ....... 200/50.23 |
| 4,269,285 A | * | 5/1981 | Ohkoshi et al. ............ 187/270 |
| 4,459,076 A | | 7/1984 | Pettersson |
| 4,604,724 A | | 8/1986 | Shaginian et al. |
| 4,743,715 A | * | 5/1988 | Gerbert-Gaillard et al. ....................... 200/50.26 |
| 5,408,767 A | | 4/1995 | Hazama et al. |
| 5,453,587 A | * | 9/1995 | Hurley et al. ............. 200/50.24 |
| 5,477,017 A | * | 12/1995 | Swindler et al. ......... 200/50.24 |
| 5,621,643 A | | 4/1997 | Nakagami et al. |
| 5,638,387 A | | 6/1997 | Palleggi et al. |
| 5,659,471 A | | 8/1997 | Parmee et al. |
| 5,721,406 A | * | 2/1998 | Book et al. ............... 200/50.24 |
| 5,798,920 A | | 8/1998 | Crucius et al. |
| 5,856,643 A | * | 1/1999 | Gress, Jr. et al. ........ 200/50.32 |
| 5,974,352 A | | 10/1999 | Shull |
| 6,028,272 A | * | 2/2000 | Akers ....................... 200/50.26 |
| 6,205,687 B1 | | 3/2001 | Rocke |
| 6,264,418 B1 | | 7/2001 | Michael et al. |
| 6,269,913 B1 | | 8/2001 | Kollmannsberger et al. |

* cited by examiner

Primary Examiner—Elvin Enad
Assistant Examiner—K. Lee
(74) Attorney, Agent, or Firm—José R. de la Rosa

(57) ABSTRACT

A racking apparatus 10 is provided for remotely inserting into and removing an industrial electric circuit breaker from a cell housing. The racking apparatus includes a housing having a base 12 and a frame 14 extending upwardly from the base. A wheel structure 20, 22, 24 is coupled to the base to permit wheeled movement of the housing. A motor mount structure 32 is coupled to the frame for generally vertical movement toward and away from the base. An electric motor 34 is mounted to the motor mount structure. The motor has a shaft 35 and an adaptor structure 36 is operatively associated with the shaft. The adaptor structure is constructed and arranged to be coupled to a circuit breaker. Actuating structure 40 is associated with the motor mount structure to cause the generally vertical movement of the motor mount structure. A controller 56 is carried by the housing for controlling the motor and the actuating structure. A control station 62 is operatively associated with the controller to operate the controller at a location remote from the apparatus.

26 Claims, 4 Drawing Sheets

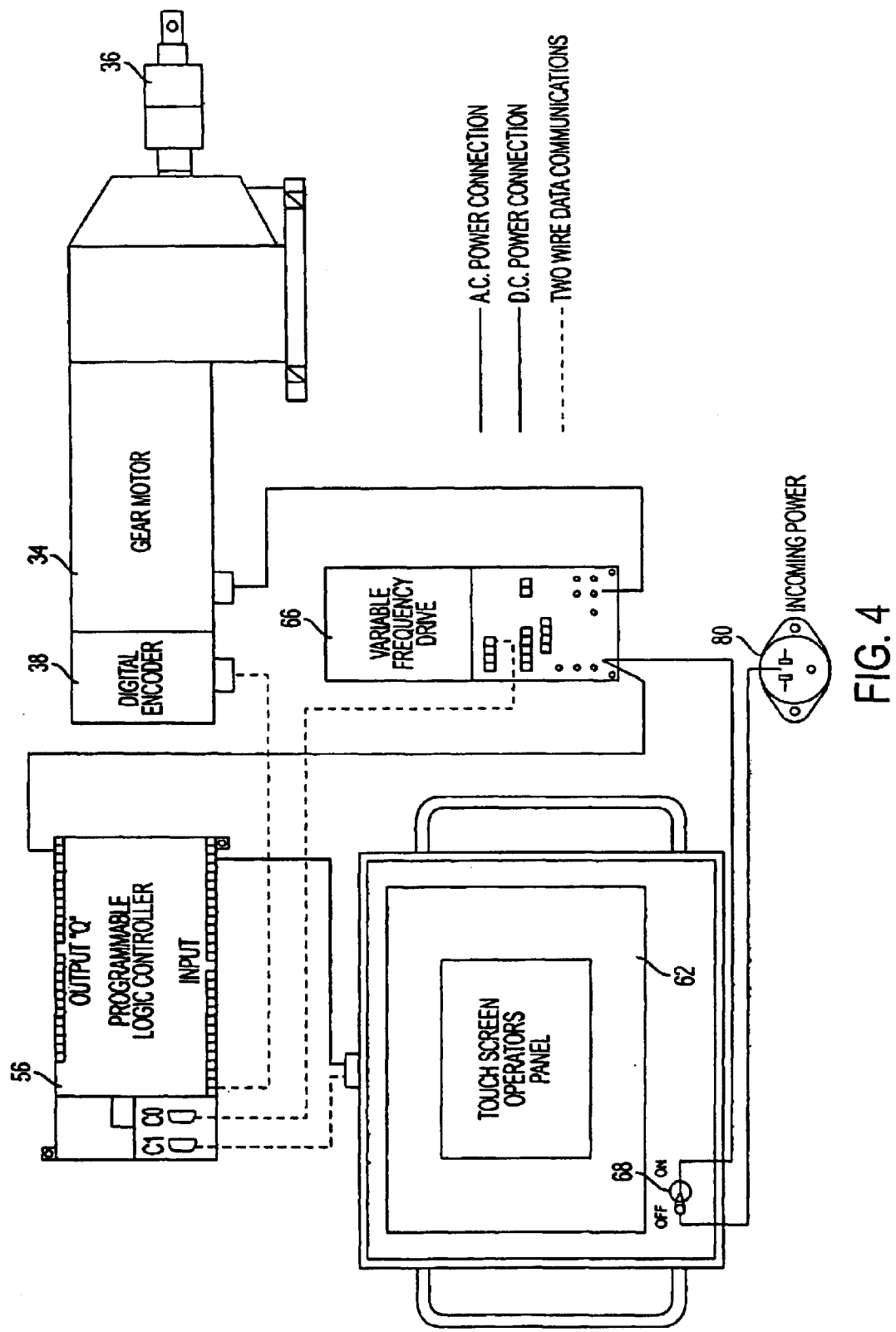

APPARATUS AND METHOD FOR REMOTELY MOVING A CIRCUIT BREAKER INTO OR FROM A CIRCUIT BREAKER CELL HOUSING

This application is based on U.S. Provisional Application No. 60/369,740, filed Mar. 28, 2002, and claims the benefit thereof for priority purposes.

FIELD OF THE INVENTION

The invention relates to racking of industrial electric circuit breakers and, more particularly, to an apparatus and method of remotely moving a circuit breaker into or out of a circuit breaker cell housing.

BACKGROUND OF THE INVENTION

In utility or industrial applications, medium voltage circuit breakers are employed to establish and break the electrical circuits. There are times when it is necessary to remove and insert these circuit breakers from or into the circuit breaker cell housing for repair or replacement or to control load requirements.

In the past, the circuit breakers were moved manually with the operator engaging an elongated shaft associated with the circuit breaker. Since the operator must be physically near the circuit breaker during the racking process, there is a possibility of injury or death should an electrical failure occur during the process. Furthermore, the circuit breaker or cell housing can be damaged during the manual racking process if a malfunction occurs.

Thus, there is a need to provide an apparatus and method for remotely moving a circuit breaker into or from a cell housing with operator at a safe distance from the circuit breaker and with the apparatus monitoring electrical current and position to detect equipment malfunction thereby protecting the equipment from sever damage and/or major failure.

SUMMARY OF THE INVENTION

An object of the invention is to fulfill the need referred to above. In accordance with the principles of the present invention, this objective is achieved by providing a racking apparatus for remotely inserting into and removing an industrial electric circuit breaker from a cell housing. The racking apparatus includes a housing having a base and a frame extending upwardly from the base. Wheel structure is coupled to the base to permit wheeled movement of the housing. A motor mount structure is coupled to the frame for generally vertical movement toward and away from the base. An electric motor is mounted to the motor mount structure. The motor has a shaft and an adaptor structure that is operatively associated with the shaft. The adaptor structure is constructed and arranged to be coupled to a circuit breaker. Actuating structure is associated with the motor mount structure to cause the generally vertical movement of the motor mount structure. A controller is carried by the housing for controlling the motor and the actuating structure. A control station is operatively associated with the controller to operate the controller at a location remote from the apparatus. Thus, with a circuit breaker coupled to the adaptor structure, an operator can move the circuit breaker while being located a safe distance from the circuit breaker.

In accordance with another aspect of the invention, a method for remotely inserting into or removing an industrial electric circuit breaker from a cell housing with a racking apparatus is provided. The racking apparatus includes a housing, wheels coupled to the housing to permit wheeled movement of the housing, an electric motor mounted to the housing, the motor having a shaft and an adaptor structure operatively associated with the shaft, the adaptor structure being constructed and arranged to be coupled to a circuit breaker, a controller carried by the housing for controlling the motor, an encoder associated with the motor to track a position of the shaft of the motor, the encoder being electrically coupled with the controller to provide shaft positioning information to the controller, and a control station operatively associated with the controller to operate the controller at a location remote from the apparatus. The method includes moving the housing to a circuit breaker. The adaptor structure is then coupled to the circuit breaker. The controller is operated remotely from the racking apparatus via the control station to control the motor while monitoring current of the motor at each of a plurality of position points of the circuit breaker as determined by the encoder to develop a reference profile including a reference current corresponding to each position point. The reference profile is stored in memory. The method then includes determining when the circuit breaker is at one of the position points. At the one position point, the present motor current is compared with the reference current corresponding to the one position point. If the present motor current is a certain valve higher than the reference current, an alarm is signaled.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which:

FIG. 4 is a schematic illustration of power and communications flow of the apparatus of FIG. 1.

DETAILED DESCRIPTION OF THE EXEMPLARY EMBODIMENT

Figure 2:
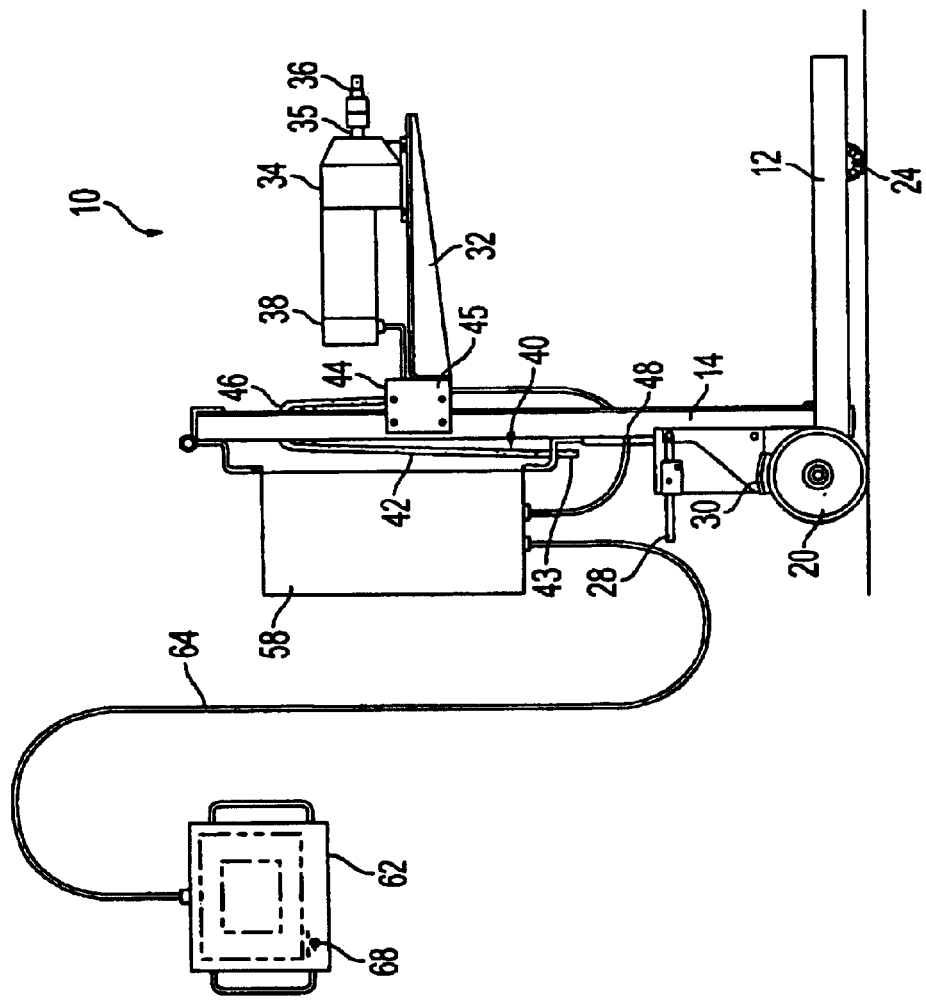
FIG. 2 is side view of the racking apparatus of FIG. 1.
Figure 1:
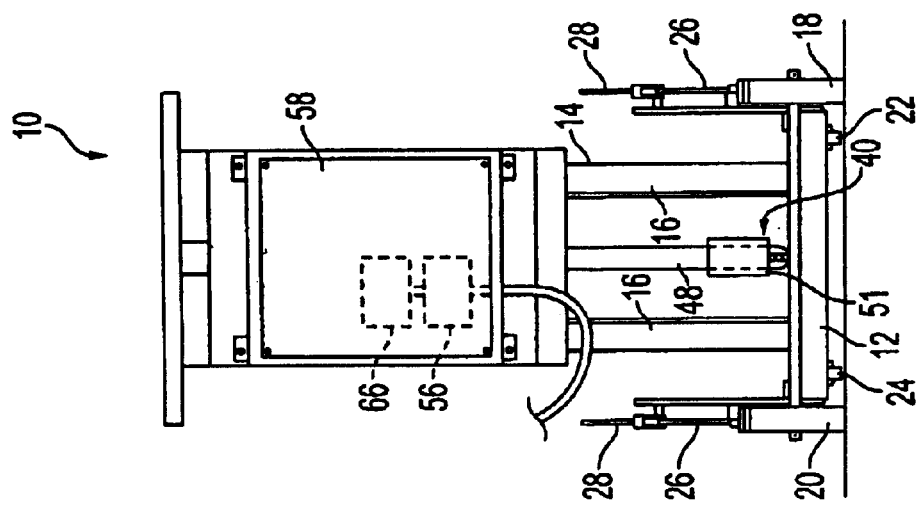
FIG. 1 is rear view of a racking apparatus provided in accordance with the principles of the invention.

With reference to FIGS. 1 and 2, an exemplary embodiment of a portable circuit breaker racking apparatus is shown, generally indicated at 10, in accordance with the principles of the present invention. The racking apparatus 10 includes a housing having a base 12 and a frame 14 extending upwardly from the base 12. In the illustrated embodiment and as best shown in FIG. 1, the frame includes a pair of spaced members 16. Wheel structure is coupled to the base 12 to permit wheeled movement of the housing. In the embodiment, the wheel structure includes at least one pair main wheels 18 and 20 at opposing ends of the a rear of base 12 near a rear thereof, and a pair of secondary wheels 22 and 24 near a front of the base 12. The rear wheels 18 and 20 are mounted for rotation and the front wheels 22 and 24 are preferably casters so as to rotate and swivel to ease in movement of the housing. A brake 26 is associated with each of the main wheels 18 and 20 to prevent rotation of the main wheels, the purpose of which will be explained below. In the embodiment, each brake 26 includes a lever 28 that is manually movable to pivot a fiction member 30 into engagement with the associated wheel, thereby locking the housing in place.

Figure 3:
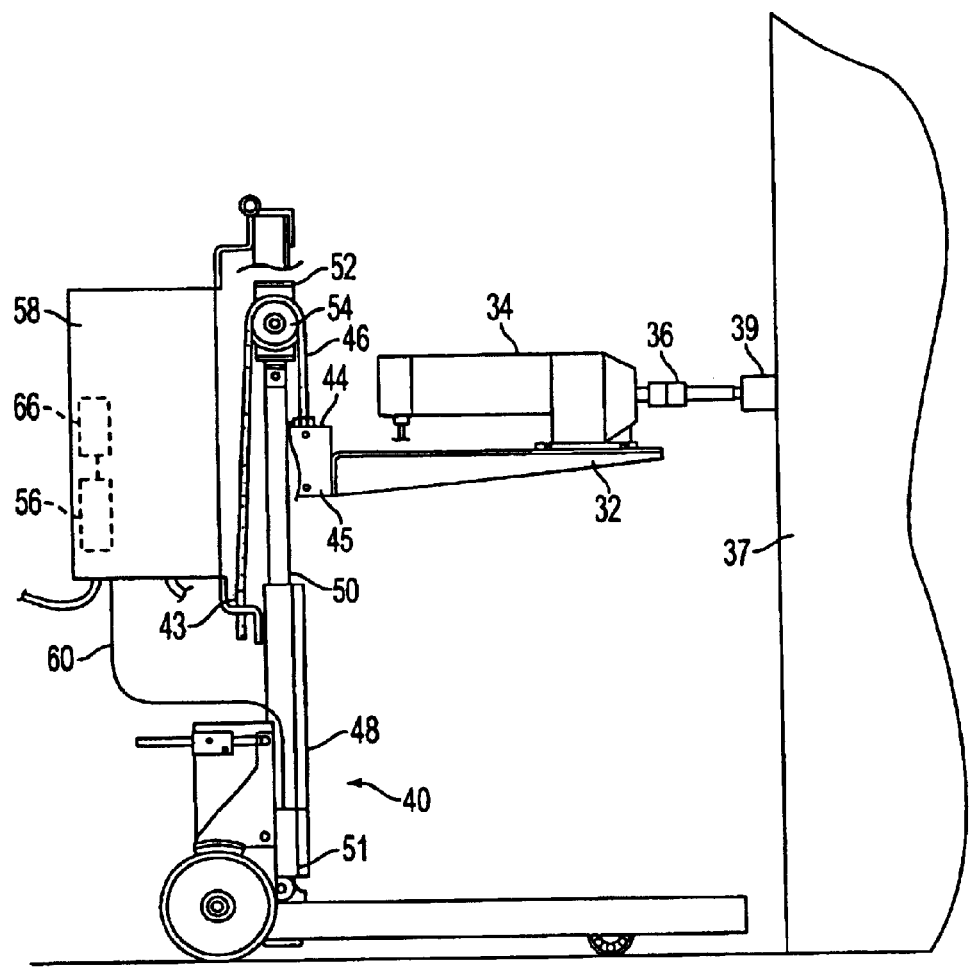
FIG. 3 is a view of the racking apparatus of FIG. 2, shown with a portion of the frame removed to clearly illustrate the actuating structure.

A motor mount structure 32 is coupled to the frame 14 for generally vertical movement toward and away from the base 12. An electric motor, preferably a gear motor 34, is fixedly mounted to the motor mount structure 32. The motor 34 has a rotatable shaft 35 and an adaptor structure 36 is operatively associated with the shaft 35. As shown in FIG. 1, the adaptor structure 36 is coupled directly to the shaft and is constructed and arranged to be coupled to a circuit breaker 37 (FIG. 3). A digital encoder 38 is associated with the motor 34 to track a position of the shaft 35 of the motor and thus the position of the circuit breaker when coupled to the adaptor structure 36, as explained more fully below.

Due to different circuit breaker designs having different elevation locations of racking, the apparatus 10 includes an elevation adjustment feature. More particularly, actuating structure, generally indicated at 40, is associated with the motor mount structure 32 to cause the generally vertical movement thereof. In the embodiment and as best shown in FIG. 3, with a portion of the frame 14 removed for clarity of illustration, the actuating structure 40 includes a chain 42 having one end 43 fixed to the frame 14. The other end 44 of the chain is coupled to the bracket 45 of the motor mount structure 32. The actuating structure includes a linear actuator having a fixed cylinder 48 and a movable actuator shaft 50 that can extend from and retract into the cylinder in the conventional manner via an electric motor 51. The shaft 50 of the actuator moves a sprocket cage 52 containing a sprocket 54. The sprocket 54 engages the chain 42. As the shaft 50 is extended, the motor mount structure 32 moves up. When the shaft 50 is retracted, the motor mount structure moves down.

The motor 51 is controlled by a programmable logic controller (PLC) 56, such as Siemens S7-200 PLC, that is disposed in control box 58 mounted to the frame 14. A cable 60 electrically connects the motor 51 with the controller 56. Operation of the PLC 56 is achieved via an operator control station 62 (FIG. 2) that communicates with the PLC at a cable 64 to operate the PLC 56 via a location remote from the circuit breaker when coupled with the apparatus 10. In the embodiment, the cable has a length of about 40 feet to ensure that the operator is can be a safe distance (e.g., per NFPA 70E) from the circuit breaker when moving the circuit breaker. Instead of using the cable 64, wireless communication can be employed between the control station 62 and the PLC 56. The control station 62 includes "raise" and "lower" buttons to control the motor 51.

The actuating structure 40 not only allows adjustment of the motor mount structure 32 to coupled with different makes and types of circuit breakers, it also allows minor elevation adjustment between breakers of the same make and type required due to floor variations, manufacturing tolerances, etc.

In addition to the powered elevation adjustment via the actuating structure 40, the apparatus 10 employs a remotely powered "jog" function. The adaptor structure 36 engages a receiver on the circuit breaker to be moved. After proper elevation adjustment is completed, a rotational alignment is performed before compete engagement with the circuit breaker is accomplished. The apparatus employs a Jog CW and a Jog CCW function to achieve the rotational alignment. This function is controlled by the operator at the remote control station 62. A variable frequency drive 66 associated with the gear motor 34 is utilized to run the motor 34 at a very low speed and in the direction defined by the operator's command from the control station 62 through the PLC and to the motor drive 66.

The apparatus 10 is configured for remote racking of circuit breakers of various manufacturers and types, requiring minimal physical changes to the apparatus. Thus, the height of the housing, the adaptor tool, and the motor mount structure can be modified to accommodate breakers of different manufacturers.

Power assist in connecting or disconnecting a circuit breaker is accomplished by using the three-phase gear motor 34. The motor gear box output speed is preferably a maximum of 70 RPM, and the speed of motor 34 is a maximum of 1800 RPM. The motor 34 is controlled by the variable frequency drive 66 that starts, stops, reverses and varies the speed of the motor 34 as required. The drive 66 is controlled by the programmable logic controller (PLC) 56 and its program. The operator input and system feedback to the operator is achieved via the touch screen control station 62 that communicates with the PLC 56 and its program. The position of the circuit breaker, coupled to the apparatus 10 via adaptor structure 36, is tracked by the digital encoder 38, preferably located on a fan portion of shaft 35 of the gear motor 34. As the gear motor 34 turns, the encoder 38 sends ten pulses per revolution of the motor to the PLC 56. The encoder 38 and the PLC 56 allow the creation of a linear counter.

As the motor 34 rotates, it rotates the racking mechanism (not shown) of the circuit breaker to cause the circuit breaker to move forward or backward in its cell housing. Therefore, for each rotation of the motor 34, the circuit breaker moves in or out a certain number of inches. A typical circuit breaker moves 10 to 20 inches from its connected to disconnected position. This typically results in a count of 10,000 to 20,000 counts or approximately, 1000 counts per inch of circuit breaker travel.

By way of programming, the connected position of the circuit breaker is defined as 000 counts and the disconnected position is established and defined as a number of counts (typically 15,575). This linear counter allows very accurate tracking of the breaker as it travels from one position to another. This linear counter is used to start and stop the gear motor 34 at the proper times to accomplish the proper position of the breaker.

A "torque profile" protection utilizes the linear counter to provide an accurate location of the breaker during the racking process. The variable frequency drive 66 is used to provide current or torque feedback from the motor 34 to the PLC 56 on a continuous basis. A torque profile generator program of the PLC 56 generates an initial torque profile for each circuit breaker by establishing profile position points along the travel distance. Typically 100 equal increments or number of encoder pulses are used. Using the linear counter, the program identifies the profile position point, checks the current or torque value and stores the information in the PLC memory for that particular circuit breaker. In the embodiment, the PLC checks the variable frequency drive 66 and stores the gear motor current value that corresponds to the breaker location or encoder pulse count. The gear motor current is a direct representation of torque. As the breaker is moved, the linear counter changes. At the next profile position point, the current or torque is checked and stored. This is done approximately 100 times between the positions of the breaker.

Once the torque profile of a breaker is generated and stored in memory, it is used as a reference for any future operations of the circuit breaker. The same profile position points used in generating the torque profile are used in monitoring the torque profile. In monitoring the torque profile, the linear counter is used to determine when the breaker is at a profile position point. When the breaker reaches a profile position point, the present motor current or torque is compared to the motor current or torque stored as a reference or as a base line. If the present value is larger than the stored value, the program initiates an over torque stop of the system.

FIG. 4 is a schematic illustration of the power and communications flow of the apparatus 10. The gear motor 34, that supplies power to rack the circuit breaker, is powered by the variable frequency drive 66. The variable frequency drive gets its power form the incoming power supply 80. As noted above, the PLC 56 communicates with the control station 62 to obtain operator commands and to supply system data to the operator. The PLC 56 communicates with the variable frequency drive 66 to control the direction, speed and other parameters of the gear motor 34. The PLC also receives motor data from the drive 66 (e.g., motor current, speed, etc.). The PLC communicates with the digital encoder 38 to tabulate the encoder pulses as the gear motor 34 operates, therefore monitoring the position of the circuit breaker.

To move a circuit breaker, the apparatus 10 is rolled into place and positioned by an operator. The apparatus 10 is connected to the circuit breaker racking mechanism 39 (FIG. 3) via the adaptor structure 36. After alignment and connection, the operator sets the wheel brakes to keep the apparatus 10 from moving during operation. Positioning of the gear motor 34 and the adaptor structure 36 is facilitated by the remote elevation adjustment of the motor mounting structure 32 via the actuating structure 40, and the remote Jog function of the gear motor 34.

After the apparatus 10 is positioned, connected, and secured, the operator takes the control station 62 and moves to a safe distance and location from the circuit breaker to be moved or racked. Using the control station 62, the operator commands and directs the gear motor 34 to move the breaker as required. As noted above, the control station is a touch screen device that cues the operator for required actions and inputs. The control station 62 supplies the operator with information regarding current of the gear motor 34, breaker position and fault conditions. In addition, the control station 62 is equipped with a power on/off switch 68, so as to stop operation of the apparatus in the event an emergency situation occurs.

In racking a circuit breaker in and out, there are several high torque and low torque points along the way. The torque profiling of the apparatus 10 provides the system the ability to discern between normal high torque required by the racking function and abnormal high torque due to a malfunction.

Figures 5, 6:
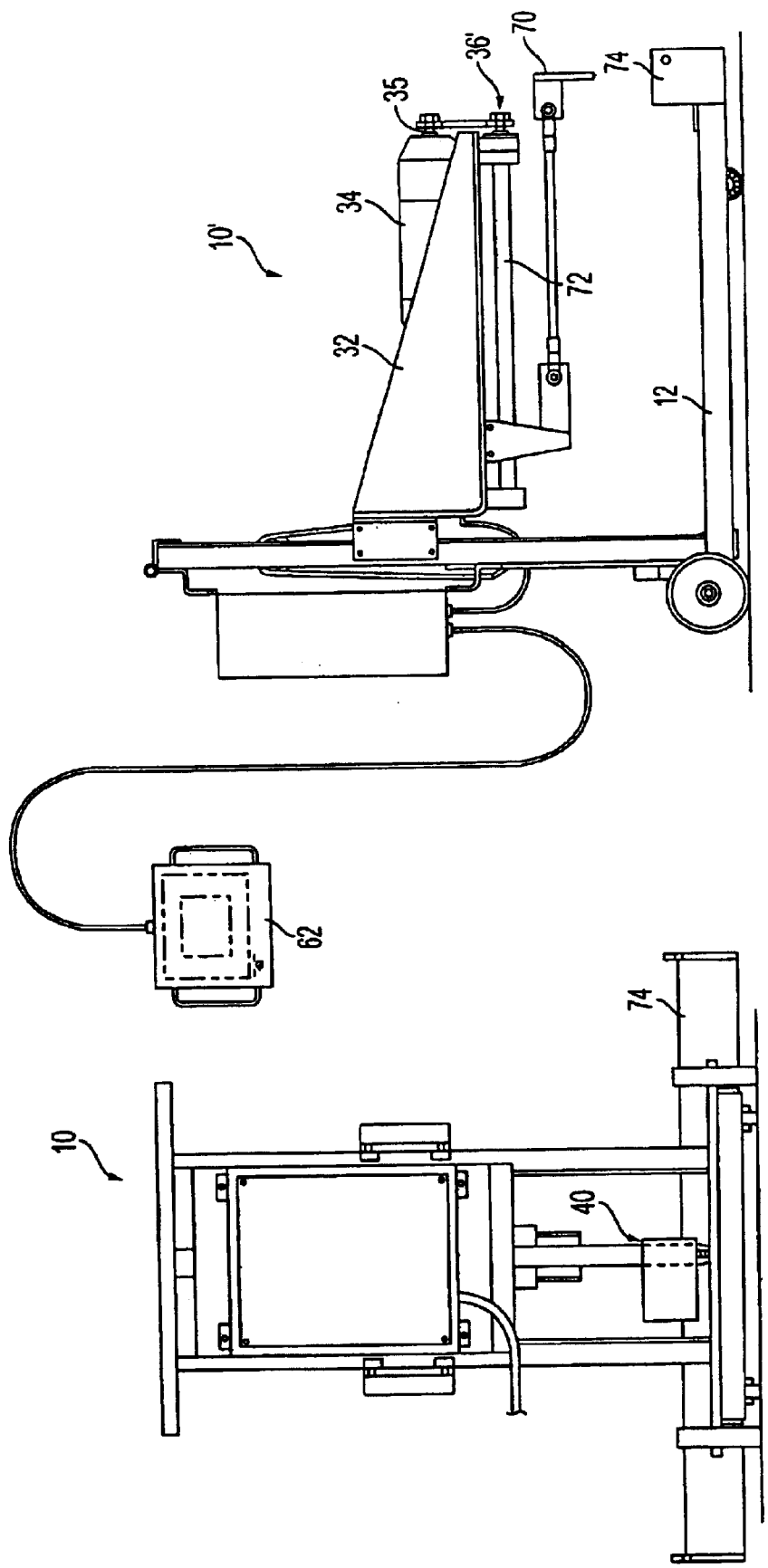
FIG. 5 is rear view of a racking apparatus provided in accordance with a second embodiment of the invention.
FIG. 6 is side view of the racking apparatus of FIG. 5.

FIGS. 5 and 6 illustrates a second embodiment of the apparatus 10' of the invention. The apparatus 10' is similar to that of FIGS. 1 and 2, but is employed on circuit breakers that do not have built-in racking mechanisms such as those disclosed in U.S. Pat. No. 5,453,587, the contents of which is hereby incorporated by reference into the preset specification. Thus, the adaptor structure, generally indicated at 36', includes an adaptor bracket 70 coupled to a screw device 72. The screw device 72 is operatively coupled to the shaft 35 of the gear motor 34 such that rotation of the shaft 34 turns the screw device 72 to move the adaptor bracket 70 linearly and thus linearly move a circuit breaker associated therewith. For this operation, the apparatus must be secured to the switchgear frame or cell housing. Thus, the apparatus 10' includes a bracket 74 coupled to the base 12 for attachment to a switchgear frame or cell housing (not shown). The bracket 74 can be modified to accommodate various switchgear cell configurations.

The apparatus 10 supplies the following protective functions:

Individual breaker "torque profile" protection
Individual breaker over travel protection
General over torque protection
Emergency over torque protection
Encoder failure protection
Gear motor stall protection The use of digital encoder positioning, current monitoring, and programmable logic control allow for program generation of a torque profile for each classification and/or type of medium circuit breaker. The combination of the torque profile, position sensing of the circuit breaker and current monitoring give exact, accurate and extremely fast monitoring and protection of the circuit breaker and its cell housing.

The apparatus 10 advantageously knows the position of the circuit breaker at and between the connected and disconnected positions thereof at all times, without having to add some device in each breaker switchgear cell.

The apparatus 10 eliminates the need for operators to be within the "flash boundary" as defined by NFPA 70E and the requirement to wear specified personal protective equipment. The apparatus enhances operator safety and maintains precise monitoring and protection of the breakers and cell housings. Cameras or monitors can be employed on the apparatus 10 to further enhance operation of the apparatus.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A racking apparatus for remotely inserting into and removing an industrial electric circuit breaker from a cell housing, the racking apparatus comprising:

a housing having a base and a frame extending upwardly from the base, wheel structure coupled to the base to permit wheeled movement of the housing, a motor mount structure coupled to the frame for generally vertical movement toward and away from the base, an electric motor mounted to the motor mount structure, the motor having a shaft and an adaptor structure operatively engaged to the shaft, the adaptor structure being constructed and arranged to be coupled to a circuit breaker, actuating structure operatively engaged to the motor mount structure to cause the generally vertical movement of the motor mount structure, a controller carried by the housing for controlling the motor and the actuating structure, and a control station operatively engaged to the controller to operate the controller at a location remote from the apparatus.

2. The apparatus of claim 1, further comprising an encoder operatively engaged to the motor to track a position of the shaft of the motor, the encoder communication with the controller to provide shaft position information to the controller, and wherein a variable frequency drive drives the motor.

3. The apparatus of claim 2, wherein the controller is constructed and arranged to control the variable frequency drive and to monitor current of the variable frequency drive at a present position of the shaft, the controller monitors an over torque condition by comparing the monitored current at the present position to a reference value current established at a position of the shaft corresponding to the present position, when a circuit breaker is being inserted or removed from a cell housing via the racking apparatus.

4. The apparatus of claim 3, wherein the controller is constructed and arranged to signal an alarm when the monitored current is predetermined amount higher than the reference value current.

5. The apparatus of claim 1, wherein the wheel structure includes at least one pair of wheels mounted at opposing sides of the base.

6. The apparatus of claim 5, further comprising brake structure selectively engaged to each wheel of said pair of wheels for selectively preventing rotation of the wheels.

7. The apparatus of claim 1, wherein the control station is electrically coupled to the controller via a length of cable.

8. The apparatus of claim 1, wherein the actuating structure includes an actuator shaft movable by a motor within a cylinder, a chain having one end fixed to the frame and another end fixed to the motor mount structure, the chain engaging a sprocket, the actuator shaft being operatively engaged to the sprocket such that extension of the actuator shaft raises the motor mount structure and refraction of the actuator shaft lowers the motor mount structure.

9. The apparatus of claim 1, wherein the controller is a programmable logic controller.

10. The apparatus of claim 1, wherein the controller is disposed in a control box mounted to the frame.

11. The apparatus of claim 1, wherein the adaptor structure is coupled directly to the shaft.

12. The apparatus of claim 1, wherein the adaptor structure includes an adaptor bracket constructed and arranged to engage a circuit breaker, the adaptor bracket being coupled to a screw device, the screw device being operatively coupled to the shaft such that rotation of the shaft turns the screw device to move the adaptor bracket linearly.

13. The racking apparatus of claim 1, wherein the encoder is a digital encoder.

14. A racking apparatus for remotely inserting into and removing an industrial electric circuit breaker from a cell housing, the racking apparatus comprising:

a housing, means for permitting movement of the housing along a surface, motor mount structure coupled to the frame for generally vertical movement toward and away from the base, an electric motor mounted to the motor mount structure, the motor having a shaft and an adaptor structure operatively engaged to the shaft, the adaptor structure being constructed and arranged to be coupled to a circuit breaker, actuating means for causing the generally vertical movement of the motor mount structure, control means for controlling the motor and the actuating means, and a control station operatively engaged to the control means to operate the control means at a location remote from the apparatus.

15. The apparatus of claim 14, further comprising an means for tracking a position of the shaft of the motor, the means for tracking communicating with the control means to provide shaft position information to the control means, and wherein a variable frequency drive drives the motor.

16. The apparatus of claim 15, wherein the control means is constructed and arranged to control the variable frequency drive and to monitor current of the variable frequency drive at a present position of the shaft, the control means monitors an over torque condition by comparing the monitored current at the present position to a reference value current established at a position of the shaft corresponding to the present position, when a circuit breaker is being inserted or removed from a cell housing via the racking apparatus.

17. The apparatus of claim 16, wherein the control means is constructed and arranged to signal an alarm when the monitored current is predetermined amount higher than the reference value current.

18. The apparatus of claim 14, wherein the means for permitting movement of the housing includes at least one pair of wheels mounted to the housing.

19. The apparatus of claim 18, further comprising brake structure selectively engaged to each wheel of said pair of wheels for selectively preventing rotation of the wheels.

20. The apparatus of claim 14, wherein the control station is electrically coupled to the control means via a length of cable.

21. The apparatus of claim 14, wherein the actuating means includes an actuator shaft movable by a motor within a cylinder, a chain having one end fixed to the frame and another end fixed to the motor mount structure, the chain engaging a sprocket, the actuator shaft being operatively engaged to the sprocket such that extension of the actuator shaft raises the motor mount structure and retraction of the actuator shaft lowers the motor mount structure.

22. The apparatus of claim 14, wherein the control means is a programmable logic controller.

23. The apparatus of claim 14, wherein the control means is disposed in a control box mounted to the housing.

24. The apparatus of claim 14, wherein the adaptor structure is coupled directly to the shaft.

25. The apparatus of claim 14, wherein the adaptor structure includes an adaptor bracket constructed and arranged to engage a circuit breaker, the adaptor bracket being coupled to a screw device, the screw device being operatively coupled to the shaft such that rotation of the shaft turns the screw device to move the adaptor bracket linearly.

26. A method for remotely inserting into or removing an industrial electric circuit breaker from a cell housing with a racking apparatus, the racking apparatus comprising:

a housing, wheels coupled to the housing to permit wheeled movement of the housing, an electric motor mounted to the housing, the motor having a shaft and an adaptor structure operatively engaged to the shaft, the adaptor structure being constructed and arranged to be coupled to a circuit breaker, a controller carried by the housing for controlling the motor, an encoder operatively engaged to the motor to track a position of the shaft of the motor, the encoder communicating with the controller to provide shaft positioning information to the controller, and a control station operatively engaged to the controller to operate the controller at a location remote from the apparatus, the method including:

moving the housing to a circuit breaker, coupling the adaptor structure to the circuit breaker, operating the controller remotely from the racking apparatus via the control station to control the motor while monitoring current of the motor at each of a plurality of position points of the circuit breaker as determined by the encoder, to develop a reference profile including a reference current corresponding to each position point, storing the reference profile in memory, determining when the circuit breaker is at one of the position points, comparing, at the one position point, the present motor current with the reference current corresponding to the one position point, and signaling an alarm if the present motor current is a certain valve higher than the reference current.

* * * * *